United States Patent [19]

Hirayama et al.

[11] 4,060,323
[45] Nov. 29, 1977

[54] IMAGE INFORMATION HANDLING METHOD AND DEVICE

[75] Inventors: Kazuhiro Hirayama, Yokohama; Yasushi Sato, Kawasaki; Taisuke Tokiwa, Yokohama; Fujio Iwatate, Tokyo; Kazuo Kawakubo, Hino; Hisashi Nakatsui, Kawasaki, all of Japan

[73] Assignee: Canon Kabushiki Kaisha, Tokyo, Japan

[21] Appl. No.: 607,504

[22] Filed: Aug. 25, 1975

Related U.S. Application Data

[63] Continuation-in-part of Ser. No. 594,126, July 8, 1975.

[30] Foreign Application Priority Data

Sept. 9, 1974 Japan .................. 49-103642

[51] Int. Cl.² .............. G01D 15/10; G03B 23/00; G03B 27/32; G03B 27/70
[52] U.S. Cl. ..................... 355/60; 346/76 L; 354/10; 355/77
[58] Field of Search ........ 355/66, 71, 57, 11, 355/8, 60, 65, 46, 77, 2, 20, 5, 133; 354/4–10; 346/76 L; 350/161 W; 340/173 LM

[56] References Cited

U.S. PATENT DOCUMENTS

| 2,356,620 | 8/1944 | Schade ..................... 354/10 |
| 2,817,265 | 12/1957 | Covely ..................... 355/20 X |
| 2,882,792 | 4/1959 | Levine ..................... 355/71 X |
| 3,448,458 | 6/1969 | Carlson et al. ............. 346/76 L X |
| 3,465,352 | 9/1969 | Carlson et al. ............. 346/76 L |
| 3,573,849 | 4/1971 | Herriot et al. ............. 354/4 X |
| 3,721,991 | 3/1973 | Kaufman et al. ........... 354/5 X |
| 3,744,039 | 7/1973 | Hrbek et al. ............... 350/161 W X |
| 3,820,123 | 6/1974 | Ammann .................... 354/9 X |
| 3,829,209 | 8/1974 | Buddendeck et al. ....... 355/66 X |

OTHER PUBLICATIONS

I.B.M. Technical Disclosure Bulletin Scanning Method Employing Fiber Optics Bundle, J. Belleson p. 1481 vol. 15, No. 5 10/1972.

I.B.M. Technical Disclosure Bulletin Scanning Method Employing Multiple Flying Spots per Field, J. Belleson vol. 15, No. 5, pp. 1479–1480 10/1972.

Primary Examiner—Donald A. Griffin
Attorney, Agent, or Firm—Fitzpatrick, Cella, Harper & Scinto

[57] ABSTRACT

This specification discloses a method and apparatus for imaging light on a medium to form a plurality of information elements which in turn form a particular character or other image information. A plurality of light beams are formed and are modulated by information signals and then the light beams are deflected by scanning means to scan a medium, the beams being modulated in such a manner that the same modulation is applied to a predetermined number of the light beams in accordance with a desired size of the information elements formed on the medium, and wherein the size of the information elements, defined by adjacent rows of identical light spots, is changed by varying the number of light beams receiving the same modulation.

24 Claims, 9 Drawing Figures

IMAGE INFORMATION HANDLING METHOD AND DEVICE

This is a continuation-in-part of application Ser. No. 594,126, filed July 8, 1975.

BACKGROUND OF THE INVENTION

This invention relates to a method of and a device for recording image or information signals at various magnifications by the utilization of a light beam.

There have been proposed the following methods and devices for varying the magnification of an image recorded.

A first method is one which uses a beam expander to scan a single light beam to thereby vary the magnification of the formed image. According to this method, the beam diameter may be varied by the beam expander to reduce the diameter of the light spot formed on a recording surface and on the other hand, the scanning velocity of the scanner may be increased to effect high-speed scanning to thereby reduce the size of the recorded image (character, figure of the like). This method requires speed-up of the scanner and results in shorter service life of the scanner.

Another method is one whereby any desired size of character may be recorded by selecting any one of a plurality of character generators prepared in accordance with various sizes for the characters to be recorded. This method has required a number of character generators, which has led to practical problems such as complication of the control for the selection of those character generators and a consequent higher cost.

Further, there has been a method of changing the character size in the direction of column on the recording surface by varying the frequency of writing signal (clock pulse), whereas the need to vary the frequency of the clock pulse itself has involved the cumbersomeness with which, for example, the frequency of the oscillator has to be varied.

SUMMARY OF THE INVENTION

It is an object of the present invention to provide a method and a device which will enable alteration of the size of recorded images such as characters, figures or the like by using a plurality of beams and changing the number of such beams, without the need to speeding up the scanning means.

It is another object of the present invention to provide an image information recording method and a device therefor in which a light beam from a light beam generator is modulated by light modulator means in accordance with the image or similar information signal and the output of the modulator means is deflected to a light beam sensitive medium by a mirror scanner, a galvanometer mirror or the like and imaged for recording on the sensitive medium by an optical lens, and in which the magnification for such light beam recording is freely variable to make the recording more suitable for practical use.

It is still another object of the present invention to provide a method and a device for varying the magnification in which a beam of light such as laser light or the like is subjected to main deflection by main deflector means having a mirror surface rotatable or pivotable at a predetermined velocity, a medium sensitive to such light beam is continuously or intermittently moved in the direction of auxiliary deflection intersecting the direction of main deflection, the light beam is modulated by a character or like information signal and the modulated light beam is imaged on the light beam sensitive medium, and wherein the main deflection is effected by the same mirror surface of the scanner and a plurality of laser beams are modulated into light spots on the sensitive medium correlated by an information signal to thereby make the magnification of the image variable.

It is a further object of the present invention to provide such a method and device in which a high frequency wave deflector element for receiving as input a plurality of high-frequency signals different in wavelength is disposed in the path of the light beam to form a plurality of light beams, whereby a plurality of light beams corresponding to the high-frequency signals may be provided from a single light beam.

In the recording of image or similar information at varying magnification, it would occur to mind to increase the angular velocity of the mirror scanner or the like, but in this case the available magnifications are limited to integral multiples. Further, the maximum angular velocity of the mirror scanner or the like is limited and the stability and accuracy thereof are insufficient.

By employing a novel method which overcomes these problems, the presen invention can vary the magnification without increasing the angular velocity of the mirror scanner or the like, and moreover can speed up the recording speed to twice or higher as compared with the above-mentioned method. Also, the possible magnifications are not always limited to integral multiples but finer magnifications are also possible. For example, an original of JIS A4 format (210 mm × 249 mm) may be recorded on a JIS B5 size format (182 mm × 257 mm). Thus, the magnification changing method and device of the present invention are highly useful.

The above objects and other features of the present invention will become more fully apparent from the following detailed description of the invention taken in conjunction with the accompanying drawings.

DESCRIPTION OF THE PREFERRED EMBODIMENTS

Figure 1:
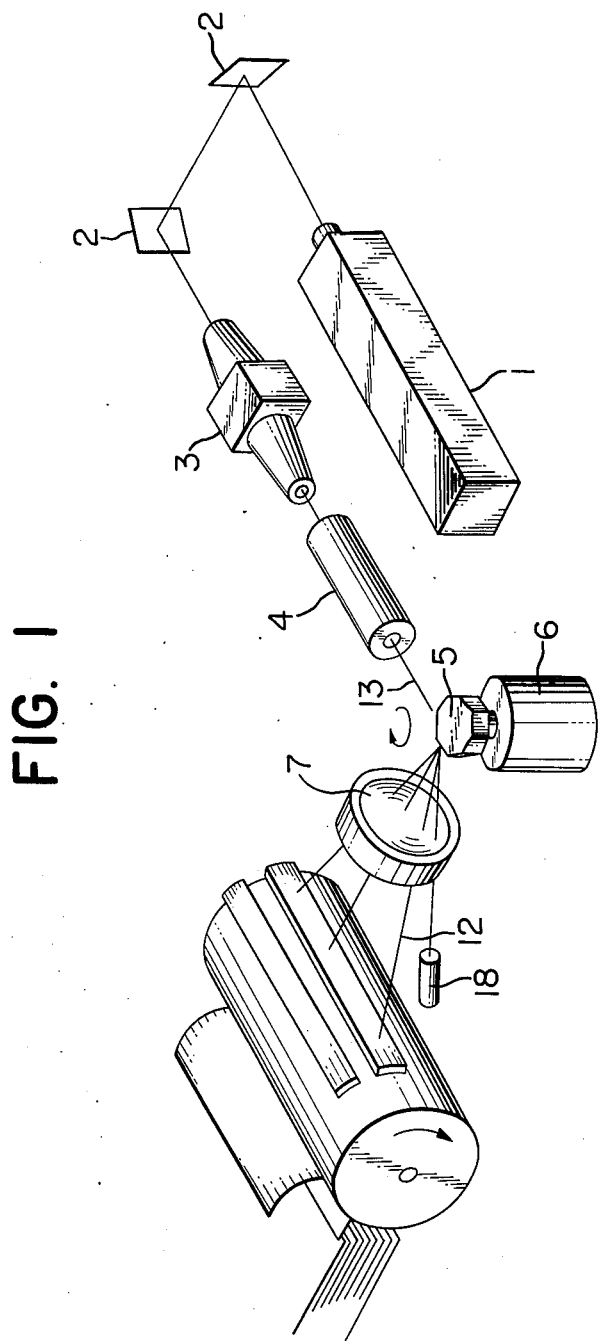
FIG. 1 is a perspective view showing the general construction of the image information recording device according to our application Ser. No. 594,126, filed July 8, 1975.

FIG. 1 shows the laser recording device previously proposed by applicants in parent application Ser. No. 594,126, filed July 8, 1975.

The laser beam oscillated by a laser oscillator 1 is directed via mirrors 2 to the input opening of a modulator 3. The mirrors 2 are inserted to bend the light path to thereby minimize the space occupied by the device, and may be eliminated if they are not necessary. The modulator 3 may especially be an acousto-optic modulator element such as glass or crystal utilizing the known acousto-optic effect, or an electro-optic element such as conventional KDP (potassium dihydrogen phosphate, $KH_2PO_4$) utilizing the electro-optic effect or ADP (ammonium dihydrogen phosphate, $NH_4H_2PO_4$). However, a liquidous or gaseous modulator may also be utilized.

In the modulator 3, the laser beam is modulated weakly or strongly in accordance with the input signal to the modulator 3.

If the laser oscillator in use is a semiconductor laser or a gas laser of the type in which current modulation is possible or a laser of the internal modulation type which has a modulator element incorporated in the path of oscillated light, the modulator 3 will be used as a deflector for effecting only fine deflection and the laser beam will be directed to a beam expander 4. The laser beam from the modulator 3 has its beam diameter enlarged by the beam expander 4 while it remains a parallel beam. The laser beam 13 with its beam diameter so enlarged impinges on a mirror scanner 5 having a mirror surface. The mirror scanner 5 is driven by a mirror scanner motor 6. A laser beam 12 swept by the mirror scanner 5 in the main scanning direction and at a predetermined angular velocity is imaged as a spot on a photosensitive drum 8 by an image forming lens 7. Designated by 18 is a light detector for detecting the arrival of the laser beam 12 to produce an electrical signal. In changing the size of character or similar information signals to be recorded, it will occur to mind to do it by changing the rate at which the information signals are read at each scanning by a line buffer. Nevertheless, in such case, the vertical-horizontal magnifications of the recorded images will only be integral multiples, such as 2X, 3X and so on, with respect to the standard size.

This method will be effective if the patterns to be recorded are simple ones, such as, for example, alphanumeric characters (7 × 9 dots per character), but in case of more complicated patterns such as Chinese characters (32 × 32 dots per character), the method will be disadvantageous because no character at intermediate magnification can be provided and the recorded characters will be too large in size. Further, this method cannot accomplish fine change of character size which is required of Chinese character printers (for example, change from 7 point to 9 point). Such a requirement would be satisfied by use of the following method. For example, by changing the magnification of the beam expander 4 to $m$ so that the diameter of the laser beam imaged on the laser sensitive drum 8 is 1/m, and by using a sufficiently large polyhedral rotatable mirror to deflect the enlarged laser beam 13, the diameter of the laser beam imaged on the sensitive drum 8 will be 1/m.

Thus, there may be provided character sizes from minimum 1/m to its integral multiples, as compared with the character size before the magnification of the beam expander 4 is changed. Assuming that $m=3$, and when the minimum character size is 6 point, there may be obtained a character size of 6 point $\times m/3$ ($m=1, 2, 3, \ldots$). However, in order that characters of 6 point may be recorded at the same speed, it will be necessary to treble the scanning frequency for the main deflection and this will give rise to numerous technical problems attributable to high-speed rotation, such as deformation of the polyhedral mirror, shorter life of the bearings, increased output of the motor, need for improved response characteristic of the modulator, etc.

The invention will now be described in detail with respect to some embodiments thereof.

EMBODIMENT 1

Figure 2:
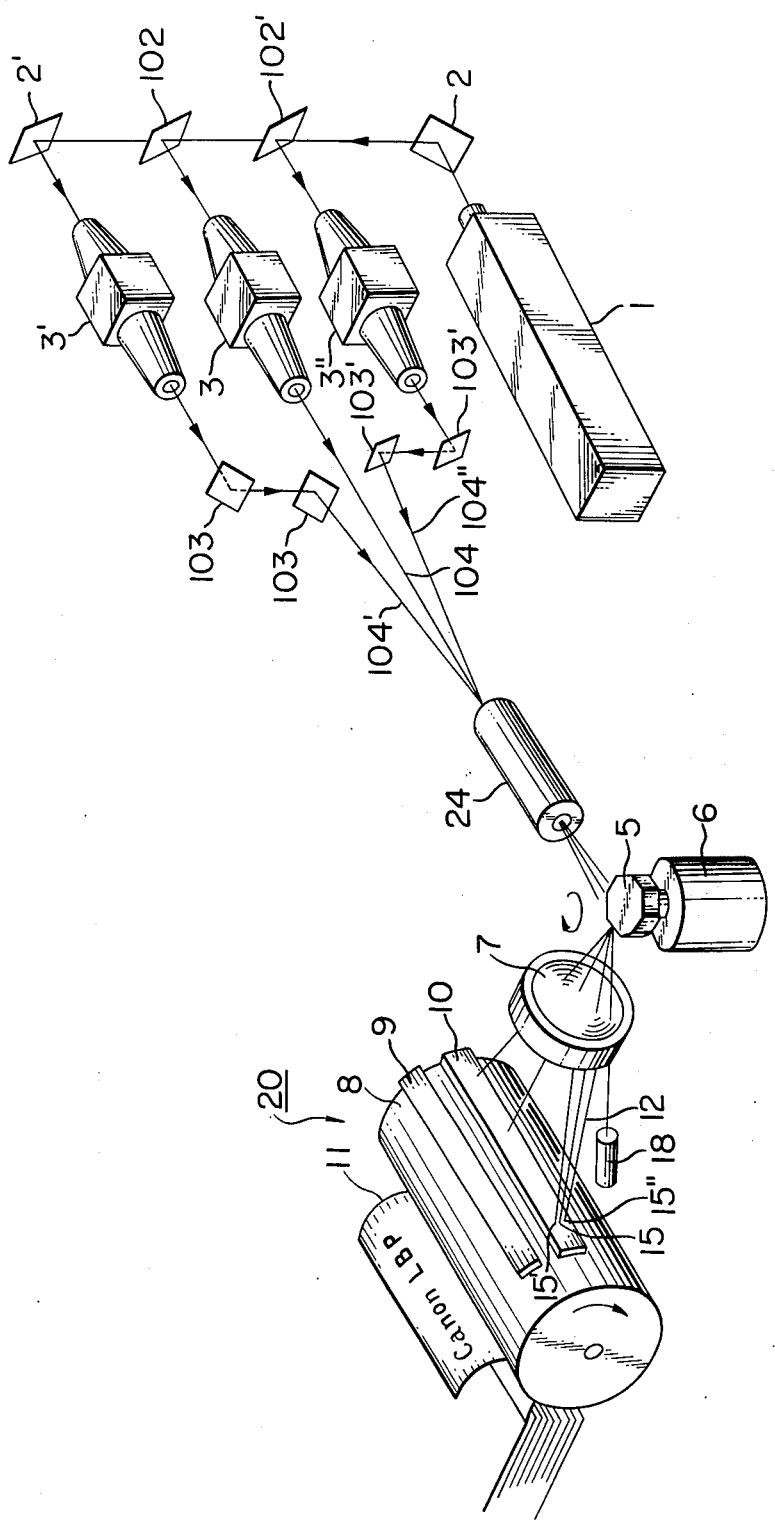
FIG. 2 is a perspective view showing an embodiment of the present invention.

FIG. 2 shows a first embodiment of the present invention, in which the elements corresponding to those already described with respect to FIG. 1 are given similar reference characters for the clarity of correspondence therebetween.

Designated by 1 is a laser oscillator as the light beam generator means, which may be any one of various well-known laser oscillators. Mirrors 2 and 2' are fixedly disposed to change the path of the laser light, and half-mirrors 102 and 102' are provided in spaced-apart relationship between the mirrors 2 and 2'. Light modulators 3, 3' and 3" are disposed in the light paths defined by the half-mirrors 102, 102' and mirror 2'. Further mirrors 103, 103 and 103', 103' are provided on the output side of the modulators to reflect the laser beams 104 and 104' modulated by the light modulators 3' and 3" to cause these beams, with the laser beam modulated by the light modulator 3, to enter a common beam expander 24.

A polyhedral rotatable mirror 5 is rotatively driven at a constant speed by driver means such as motor 6 or the like. On the emergence side of the rotatable mirror 5, there is provided an optical lens 7 for imaging the laser beam on the surface of a photosensitive recording medium 8. The lens 7 may preferably be an image forming lens having $f\text{-}\theta$ characteristic.

In the ordinary image forming lens, if the angle of incidence of the light ray is $\theta$, the position $r$ at which the light ray is imaged on the image plane is in the relation that $$r = f \cdot \tan \theta \tag{1}$$

where $f$ is the focal length of the image forming lens. The laser beam reflected by the polyhedral rotatable mirror 5 rotating at a constant velocity, as in the present embodiment, has its angle of incidence on the image forming lens 7 varied with time as a linear function. Thus, the velocity of movement of the light spot imaged on the photosensitive drum 8 which is the image plane is non-linearly varied and not constant. That is, the velocity of movement of the light spot is increased at a point whereat the angle of incidence is greater. Therefore, if the laser beam is turned on at predetermined time intervals to depict a row of spots on the photosensitive drum 8, the space intervals between these spots will be wider at the opposite ends of the row than in the middle thereof. To avoid such a phenomenon, the image forming lens 7 is designed to have a characteristic as shown below.

$$r = f \cdot \theta \tag{2}$$

Figure 8:
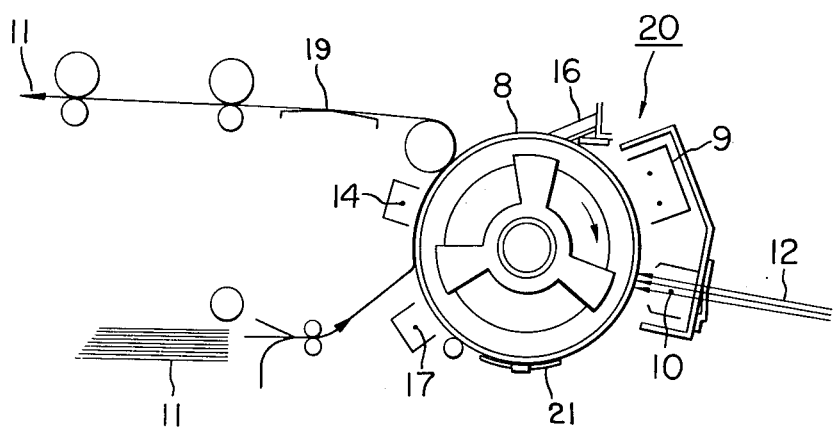
FIG. 8 is a side view of a recording portion to which the recording device of the present invention is applicable.

As shown in FIGS. 2 and 8, and as will be explained hereinafter in greater detail, the light beam recording portion, generally designated by 20, is shown to be of the type which includes the photosensitive drum 8, a primary charger 9 and a secondary charger or discharger 10 both disposed adjacent to the peripheral surface of the drum and in which a latent image formed on the photosensitive drum is made into a visible image and then transferred onto transfer paper 11. Of course, any other well-known image forming method than the shown electrophotographic image formation may be employed as an alternative.

Operation will now be described. The laser beam oscillated by the laser oscillator 1 is passed via the mirror 2 and split into three beams by the half-mirrors 102', 102 and the mirror 2', and these three beams are directed to the light modulators 3, 3' and 3" utilizing the well-known acousto-optic effect. The laser beams 104, 104' and 104", subjected to modulation in a manner which will later be described in detail, pass via the mirrors 103, 103' to the beam expander 24. At this stage, the laser beams 104, 104' and 104" are made to enter the beam expander 24 with very small angles formed therebetween so that image points 15, 15' and 15", substantially aligned and closely adjacent to one another, may be provided on the photosensitive drum 8. Since these three laser beams are simultaneously modulated by the polyhedral rotatable mirror 5, three closely adjacent and substantially parallel scanning lines can be drawn by the beams being scanned by one face of the polyhedral rotatable mirror 5. In this case, the use of the $f$-$\theta$ lens 7 as the image forming lens may result in the formation of an image which will be excellent in rectilinearity over the entire picture plane.

Figure 3:
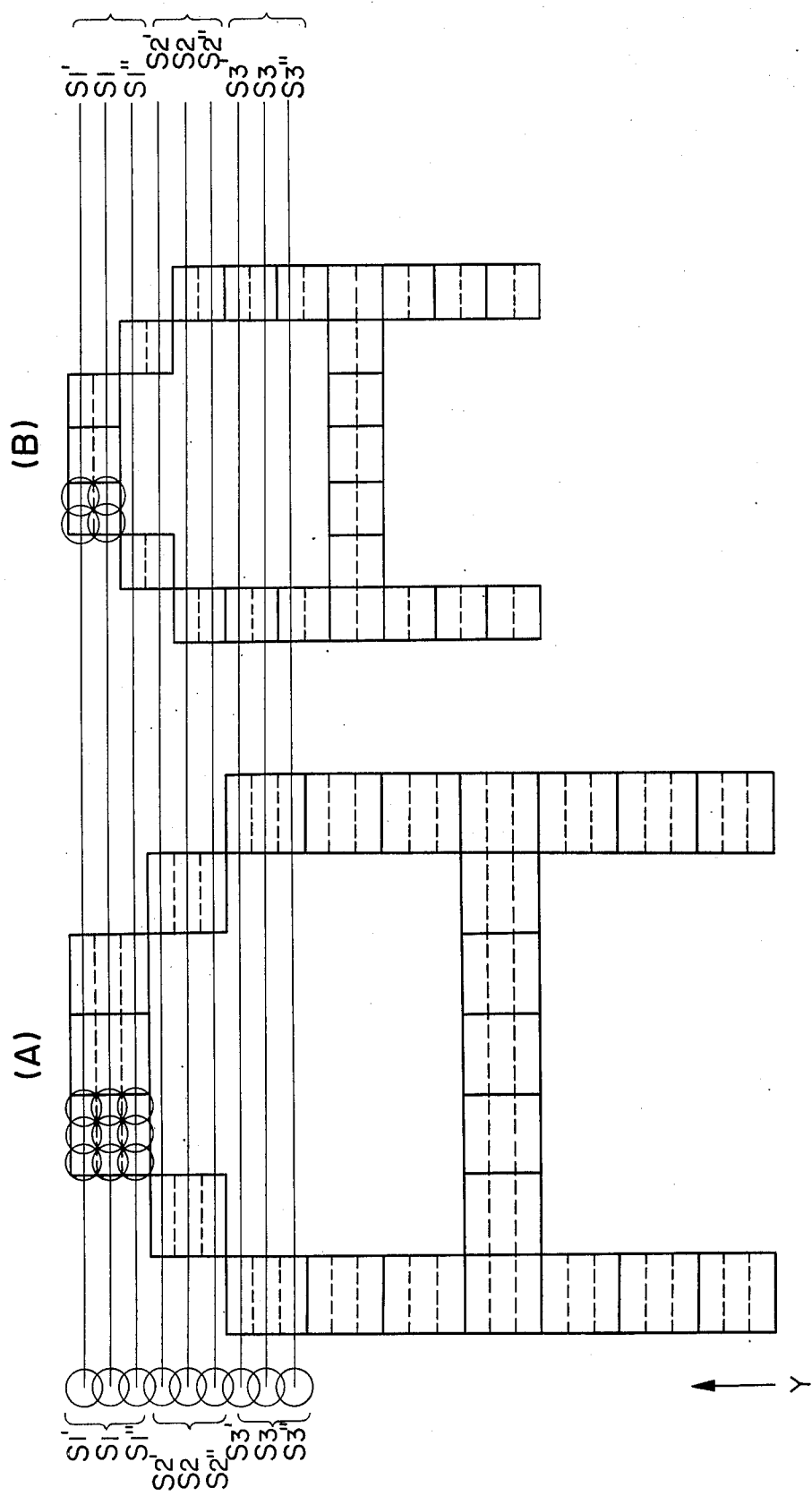
FIG. 3 illustrates the modes and magnification change of character size according to the present invention.

Reference will now be made to FIG. 3 to explain the method of changing the character size and recording the same.

In FIG. 3, $S_1$, $S_1'$ and $S_1''$ designate three scanning lines simultaneously scanned by one face of the polyhedral rotatable mirror, $S_2$, $S_2'$ and $S_2''$ are three further scanning lines scanned by the next face the mirror, and $S_3$, $S_3'$, and $S_3''$ are three further scanning lines scanned by the third face of the mirror. If the angles of incidence 104, 104' and 104" (FIG. 1) are suitably selected, the lines $S_1$, $S_1'$, $S_1''$, $S_2$, $S_2'$, $S_2''$, $S_3$, $S_3'$, $S_3''$ and so on will form a group of closely adjacent and parallel scanning lines. If the same pattern signal is then applied to the light modulators 3, 3' and 3" of FIG. 2 to modulate at a predetermined unit time (period of the reading clock pulse explained hereinafter) per picture or information element, there will be provided a pattern as shown in FIG. 3(A), for example. The shown pattern represents the alphabetical character "A". This character size is the standard record size. The standard size will be described a little further. An alphabetical character is selectively formed by nine dots in the column direction Y-direction) and seven dots in the row direction (X-direction), thus by 9 × 7 dots of picture elements. Each picture element or dot in the record size shown in FIG. 3(A) comprises 3 × 3 spots, and each spot is formed by one scanning line. Therefore, as indicated at the left top portion of the character "A", each picture element is formed by nine spots, but for the sake of simplicity, each picture element is shown in a square form. For such size of character to be depicted, the shown three scanning lines $S_1'$, $S_1$ and $S_1''$ are modulated quite in the same manner to form a first row of picture elements, the next three scanning lines $S_2'$, $S_2$ and $S_2''$ are modulated quite in the same manner to form a second row of picture elements, the further next three scanning lines $S_3'$, $S_3$ and $S_3''$ are modulated quite in the same manner to form a third row of picture elements, and similar modulations are sequentially effected until the ninth row of picture elements is formed.

In the row direction (X-direction), each scanning beam may also take the form of a single continuous row, instead of the three-spot row as shown for clarity.

Description will now be made of how to depict a character with the record size as shown in FIG. 3(B). As will be seen, in this size, each picture element is formed by 2 × 2 spots and consequently, the magnification thereof with repsect to the standard size is $\frac{2}{3}$. To depict such a character, a first row of picture elements is depicted by subjecting the scanning line $S_1'$ and $S_1$ to the same modulation, a second row of picture elements are depicted by modulaing the scanning lines $S_1''$ and $S_2'$, and third row of picture elements are depicted by modulating the scanning lines $S_2$ and $S_2''$, and similar modulations are effected for successive sets of two scanning lines $S_3'$ and $S_3$ and so on. Thus, if the same pattern signal is applied for respective sets of two scanning lines and the unit time of modulation is selected to $\frac{2}{3}$ of that in FIG. 3(A), there may be recorded a character of $\frac{2}{3}$ the standard size as sown in FIG. 3(B).

If each picture element is made to correspond to one of the scanning lines $S_1'$, $S_1$, $S_1''$, $S_2'$, $S_2$, $S_2''$, $S_3'$, $S_3$, $S_3''$ and so on, then there will be provided a record pattern in the Y-direction which is sized down to $\frac{1}{3}$ of that shown in FIG. 3(A).

Further, if each picture is made to correspond to a set of four or five scanning lines, there will be provided a record pattern enlarged in the Y-direction sized to 4/3 or 5/3 times that shown in FIG. 3(A). If, at the same time, the unit time of modulation is varied with respect to that of FIG. 3(A) which shows the standard record size, corresponding enlargement or reduction of X-direction size may be obtained.

Thus, in the illustrated example, the character size can be changed to $n/3$ times in the Y-direction ($n = 1, 2, 3$ and other integers) and continuously in X-direction.

Figure 4A:
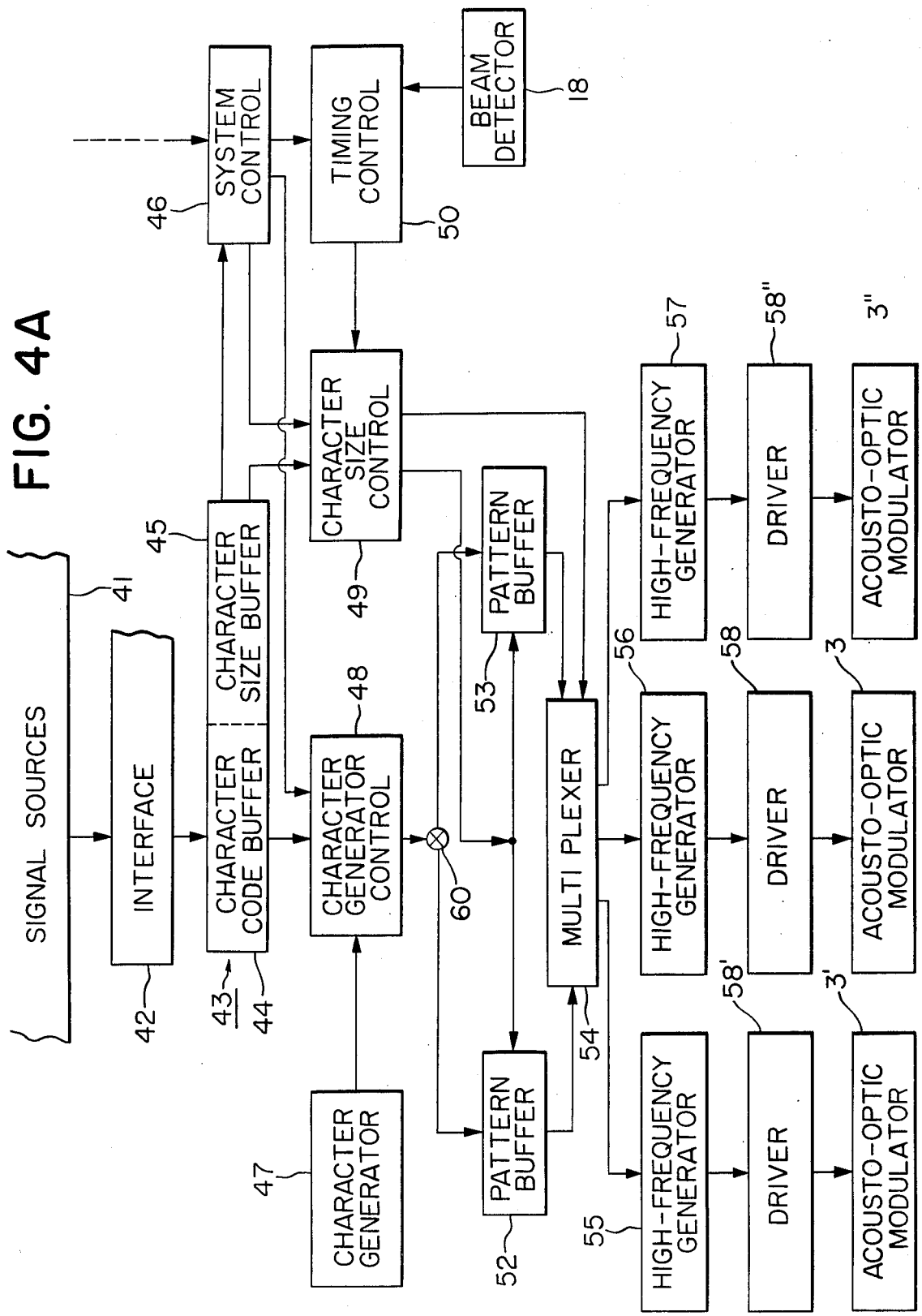
FIGS. 4(A) and (B) are block diagrams of the circuits applicable to the device of the present invention to effect the image magnification and recording according to the present invention.

FIG. 4(A) shows, in block diagram, a circuit arrangement for carrying out the change in magnification of the record pattern in the embodiment as shown in FIGS. 2 and 3(A) and (B).

Reference numeral 41 denotes an electronic computer or a magnetic tape device as a pattern information signal source. The output terminal of the signal source 41 is connected to an interface 42, the output terminal of which is in turn connected to a code buffer 43 having a character code buffer 44 and a character size buffer 45. A first of the three output terminals of the code buffer is connected to a system control 46 for controlling the entire system, a second of said three output terminals is connected to a character size control 49, and a third of said three output terminals is connected to a character generator control 48 for controlling a character generator 47. One of the two output terminals of the system control 46 is connected to the character generator 48 and the other output terminal is connected to a timing control 50. The timing control 50 is connected to the output terminal of the beam detector 18 shown in FIG. 2 and set so as to receive an electrical signal representative of the fact that a laser beam has reached the photosensitive medium adjacent to the record start point thereof.

The output terminal of the character generator control 48 is connected through a change-over switch 60 to pattern buffers 52 and 53 which in turn connected to receive the output signal from the character size control 49. The output terminals of the respective buffers 52 and 53 are connected to a multiplexer 54, which is also connected to receive as input the output signal from the character size control. Three output terminals of the multiplexer are respectively connected to three high-frequency generators 55, 56 and 57 which generate slightly different frequencies. These three generators are connected through drivers 58′, 58 and 58″ to acousto-optic modulators 3′, 3 and 3″, respectively. Operation will now be described.

The information signal for character, figure or the like from a signal source 41 such as a computer or magnetic tape device passes through the interface 42 and enters the character code buffer 44 and the character size buffer 45 of the code buffer 43 in the form of character code and character size code for at least one column, in accordance with the instruction from the system control 46. The character generator control 48 reads the character code out of the character code buffer 44 in accordance with the instruction from the system control 46, and also reads out of the character generator 47 a first and a second row of the picture elements for the one column of character pattern, and then applies them to the character pattern buffers 52 and 53, respectively, through the change-over operation of the change-over switch 60. The corresponding character size code is delivered to the character size ontrol 49, thus completing the preparations for writing. The timing conrol 50 receives a ready-for-writing signal from the system control 46, and in response to a signal from the beam detector 18 indicating that the laser beam 12 has been brought to a predetermined position by rotation of the polygonal mirror 5, the timing control deliver a clock pulse for writing to the character size control 49. The character size control counts down the clock pulse in response to the character size code, and by the clock pulse so counted down, the character pattern information being buffered by the pattern buffers 52 and 53 are delivered from these buffers through the multiplexer to the three high-frequency oscillators or generators 55, 56 and 57, whereby there are provided high-frequency outputs modulated (AM-modulated) in accordance with the inputs to these oscillators. The multiplexer 54 selects the signals buffered by the pattern buffers 52 and 53 which corresponds to the character size, and suitably supplies them to the high-frequency oscillators 55, 56 and 57 as already described in connection with Embodiment 1.

Such mode of modulation will now be explained with respect to the case where a character of the sizes shown in FIGS. 3(A) and (B) is to be recorded. In such case, modulating signals corresponding to respective ones of the nine rows in the Y-direction of the character are alternately applied as input to the pattern buffers 52 and 53 through the change-over switch 60. It is assumed that modulating signals corresponding to the picture elements forming the first row in the character "A" is applied to the pattern buffer 52. In response to the signal input from the character size control 49, the multiplexer 54 is operated to distribute the signals from the buffer 52 to the high-frequency generators 55, 56 and 57. Thus, in response to the outputs from these generators, the drivers 58′, 58 and 58″ are operated to drive the acousto-optic modulators 3′, 3 and 3″ in accordance with the frequencies of the outputs from the generators, so that the scanning lines $S_1'$, $S_1$ and $S_1''$ are modulated to form the picture elements for the first row in the character "A". These three scanning lines are simultaneously scanned by the same face of the polyhedral rotatable mirror 5.

In a similar manner, modulating signals for the picture elements in the second row are read out of the pattern buffer 53 and distributed through the multiplexer 54 to the high-frequency generators 55, 56 and 57, from which the modulating signals are applied through the drivers 58′, 58 and 58″ to the acousto-optic modulators 3′, 3 and 3″, thus depicting the picture elements for the second row in the character "A". Similar operation is sequentially repeated until at last the character as shown in FIG. 3(A) is recorded.

Description will now be made of the case where a character reduced to the ⅔ size as shown in FIG. 3(B) is to be recorded.

In this case, the scanning lines $S_1'$, $S$ and $S_1''$ are simultaneously scanned by a first mirror face of the polyhedral rotatable mirror 5, and of these scanning lines, the lines $S_1'$ and $S_1$ together must form the picture elements for the first row in the character "A" and the scanning line $S_1''$ must be modulated correspondingly to the first of the picture elements for the second row. For this purpose, a signal for modulating the scanning lines $S_1'$ and $S_1$ in common is distributed from the pattern buffer 52 through the multiplexer 54 to the high-frequency generators 55 and 56 while, on the other hand, a modulating signal corresponding to the picture elements for the second row of picture elements is supplied from the pattern buffer 53 through the multiplexer only to the high-frequency generator 57 to modulate the scanning line $S_1''$. In this manner, the drivers 58′, 58 and 58″ are respectively operated to cause the acousto-optic modulators $3_1'$, $3_1$ and $3_1''$ to modulate the scanning lines $S_1''$, $_1$ and $S_1''$ in accordance with the above-described mode of modulation.

Subsequently, the arrival of the second mirror face of the polyhedral rotatable mirror at the predetermined position is detected by the beam detector 18, whereupon the scanning beams $S_2'$, $S_2$ and $S_2''$ are scanned sequentially. At this time, as shown, the modulation of these beams must occur in such a manner that the beam $S_2'$ is modulated correspondingly to the second row of picture elememnts and the beams $S_2$ and $S_2''$ are modulated correspondingly to the third row of picture elements. For this purpose, a modulating signal corresponding to the second row of picture elements is supplied from the pattern buffer 53 through the multiplexer 54 to the high-frequency generator 55 while, on the other hand, a modulating signal corresponding to the third row of picture elements is distributed from the pattern buffer 52 throught the multiplexer 54 to the high-frequency generators 56 and 57. In this manner, the drivers 58′, 58 and 58″ are operated by the outputs from their corresponding generators to drive the acousto-optic modulators 3′, 3 and 3″ to modulate the scanning beams $S_2'$, $S_2$ and $S_2'$ so that these beams are subjected to the scanning by the above-described mirror face of the polyhedral rotatable mirror 5, whereby the remainder of the picture elements for the second row in the character and the third row of picture elements are depicted on the photosensitive drum 8.

Subsequently, arrival of the third mirror face of the polyhedral rotatable mirror at the predetermined position is detected by the beam detector 18. The scanning beams now scanned by the same mirror face are $S_3'$, $S_3$ and $S_3''$ of FIG. 3(B), and these beams correspond to the fourth row of picture elements and the upper half of the fifth row of picutre elements. A pattern modulating signal for providing the fourth row of picture elements is distributed from the pattern buffer 54 through the multiplexer 54 to the high-frequency generators 55 and 56, and a pattern modulating signal for providing the fifth row of picture elements is supplied from the pattern buffer 52 through the multiplexer 54 to the high-frequency generator 57. Thereby, the drivers 58', 58 and 58'' are operated to drive the acousto-optic modulators 3', 3 and 3'', which thus modulate the scanning beams $S_{3'}$, $S_3$ and $S_3''$.

Similar operation is thereafter repeated to record the character as shown in FIG. 3(B). In this case, it is necessary that the magnification of the character "A" in X-direction be also reduced to ⅔ of the standard size, and this may be achieved by reducing the unit time of the described modulation down to ⅔ of the unit time for the standard size.

The clearing and reading of the pattern buffers 52 and 53 may either occur during the while the scanning by one mirror face of the polyhedral rotatable mirror is beyond the effective recording range or be effected by using a set of two memories to carry out the reading and writing together with each other.

With these procedures being succesively repeated, there may be provided records of ⅔, 3/3, ..., $n/3$ character sizes by the use of a common character pattern.

Thus, the present invention can treble the frequency of the scanning beam without changing the number of revolutions of the mirror scanner driving motor and this is highly advantageous for the step-by-step magnification change of the recorded pattern in high-speed recording.

As noted above, the deflected and modulated laser beams 12 is thrown upon the photosensitive drum 8 to form a latent image thereon, which is in turn into a visible image as by the electrophotographic treating process and transferred to ordinary paper and fixed on the paper, whereafter it is withdrawn as a hard copy.

The recording portion 20 will hereinafter be described with reference to FIGS. 2 and 8.

An example of the electrophotographic process applicable to the present invention is disclosed in Japanese Patent Publication No. 23910/1967, corresponding to U.S. Pat. No. 3,666,363, wherein the insulating layer surface of a photosensitive drum 8 basically comprising an electrically conductive backup member, a photoconductive layer and an insulating layer is uniformly precharged to the positive or the negative polarity by a first corona charger 9 to thereby cause charges opposite in polarity to the precharge to be captured in the interface between the photoconductive layer and the insulating layer or in the interior of the photoconductive layer, whereafter the charged insulting layer surface is irradiated with the laser light 11 while being subjected to AC corona discharge by an AC corona discharger 10, so that a pattern resulting from the surface potential difference produced in accordance with the light-and-dark pattern of the laser light 12 is formed on the insulating layer surface, and then the entire insulating surface is uniformly subjected to exposure to thereby form an electrostatic image with high contrast on the insulating layer surface, whereafter the electrostatic image is developed into a visible image by a developing device 21 with the aid of a developer consisting chiefly of charge toner particles. Thereafter excess liquid developer is removed by corona dishcarge by corona discharger 15 after which the visible image is transferred onto a transfer medium 11 such as paper or the like by the utilization of an external field which may be supplied by corona discharger 14, and the transferred image is fixed by fixing means 19 such as infrared ray lamp or hot plate to provide an electrophotographically printed image. On the other hand, after the image transfer, the insulating layer surface is cleaned by a cleaning device 16 to removed any residual charged particles from that layer surface to permit repeated use of the photosensitive drum 8 while it is rotated by its driver means.

The above-described electrophotographic process is not the only applicable one, but other processes disclosed in Japanese Patent Publication Nos. 24748/1968 (corresponding to U.S. application Ser. No. 563,899, filed July 8, 1966) and 19748/1967 and other well-known electrophotographic process or conventional image recording process are equally applicable.

EMBODIMENT 2

In the above-described emdodiment, three laser beams modulated by three modulators are used to reflect three scanning beams simultaneously upon a common face of the mirror scanner 5. In a second embodiment now to be described, three high-frequency waves slightly different in frequency are caused to enter a single acousto-optic element in a manner which will hereinafter be described, whereby there are provided three (parallel) scanning beams scanned at a time by a common mirror face of the mirror scanner 5.

Figure 4B:
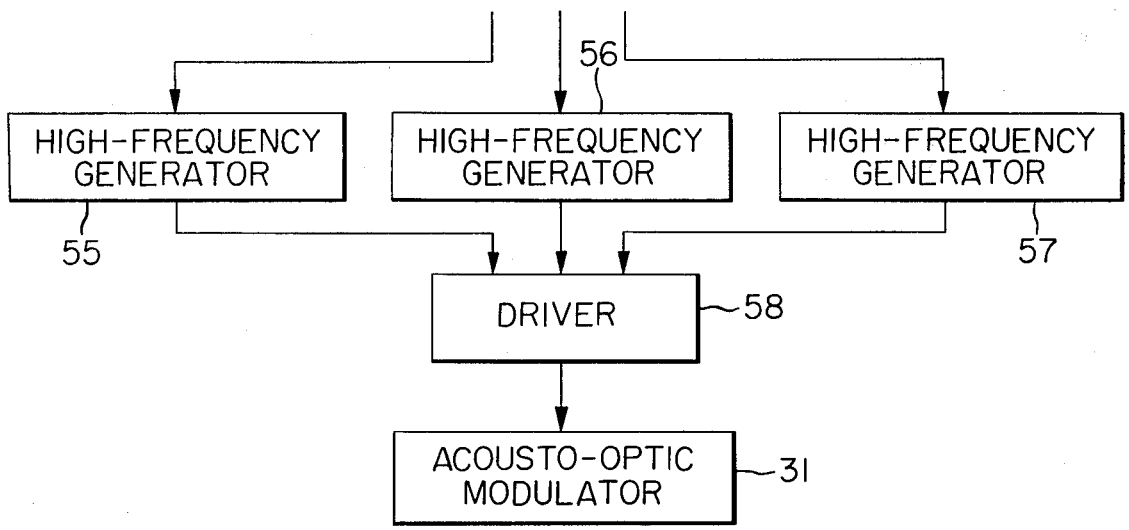
Figure 5:
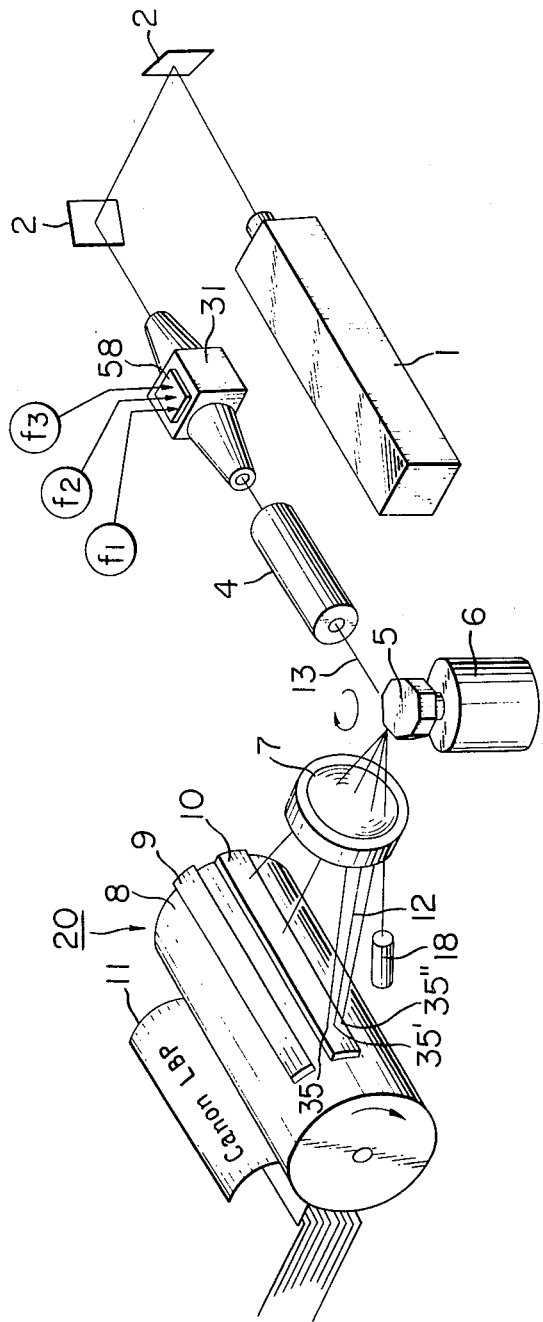
FIG. 5 is a perspective view of another embodiment of the present invention.

In FIG. 5, those of the elements which are common to the device shown in FIG. 2 are given similar reference characters and need not be described. In the present embodiment, the acousto-optic modulator-deflector 31 is connected through a driver 58 to high-frequency wave oscillators or generators 55, 56 and 57 for entering three high-frequency waves different in frequency, as indicated in FIG. 4(B). These frequencies are indicated as $f_1$, $f_2$ and $f_3$ in FIG. 5.

Application of signals to high-frequency generators 55, 56 and 57 occurs just in the same manner as that shown in FIG. 4(A), and need not be described. Three spots 35, 35' and 35'' imaged on the photosensitive drum are formed by the three scanning beams deflected by the acousto-optic element 31. The mode of this deflection may be either of the type in which a frequency is varied in the above-described time sequence to image the beams sequentially and move the spots in the sequence of 35, 35' and 35'' or of the type in which three frequencies are applied to the drive 58 at a time to provide three spots simultaneously.

Operation will now be described. In FIG. 5, high-frequency waves slightly different in frequency are applied from high-frequency power sources $f_1, f_2$ and $f_3$ through the driver 58 such as transducer or the like to the modulator-deflector 31 so as to provide a column of adjacently imaged spots on the photosensitive drum, and three high-frequency waves slightly different in frequency are generated in substantially perpendicularly intersecting relationship with the path of the laser beam. Since the wavelengths of the phase gratings formed by these high-frequency waves slightly differs from one another, the laser beam is deflected by the modulator-deflector 31 so as to be split into three beams, and these beams are reflected by the same mirror face of the mirror scanner 5 and imaged as three adjacent spots 35, 35' and 35" on the photosensitive drum 8 by the image forming lens 7. Thus, there may be provided three scanning beams simultaneously scanned by one face of the mirror scanner 5.

When this occurs, a character recording pattern signal is applied through the multiplexer to the high-frequency generators 55, 56 and 57 in the same manner as already described with respect to FIG. 4(A) to operate these generators and operate the acousto-optic element 31 so as to depict a predetermined size of character, figure or the like. Again in the present embodiment, the size of the recorded pattern may be enlarged or reduced in accordance with the character size signal in the same manner as described with respect to the previous embodiment.

The present embodiment is advantageous over Embodiment 1 in that it requires only one modulator and in addition, enables the angels of the three laser beams to be adjusted by the frequencies of the high-frequency waves.

In the foregoing two embodiments, the laser beam has been shown to form three spots, but it is of course possible to split the laser beam into any desired number of beams. As the number of spots is greater, character size change at a finer magnification is possible.

EMBODIMENT 3

This embodiment is one in which, when the character size is to be changed as described above, a single beam is finely vibrated to form a composite of several spots, thereby intending to economize the frequency of the scanning required in the recording.

Figure 6:
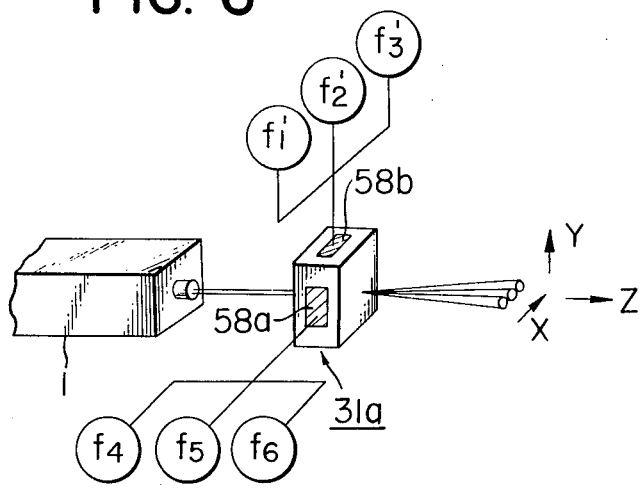
FIG. 6 shows, in perspective view, essential portions of still another embodiment of the present invention for changing the light beam diameter.

In FIG. 6, reference numeral 1 designates a laser oscillator, and 31a an acousto-optic element having transducers or drivers 58a and 58b generating a high-frequency wave for effecting fine deflection and modulation of the laser beam in directions perpendicular to each other. Means for the deflection, the imaging and the recording of the laser light subjected to the fine deflection and modulation may be identical with those elements already described, and need not be shown.

Figure 7:
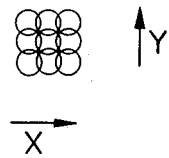
FIG. 7 illustrates the manner in which the beam diameter is enlarged by the device shown in FIG. 6.

When three high-frequency powers, such as $f_4$, $f_5$ and transducer 58a, the laser beam is deflected to form three adjacent spots in X-direction. Further, when three high-frequency powers, such as $f_1'$, $f_2'$ and $f_3'$, also slightly different in frequency are applied to the transducer 58b, the spot of laser light on the image forming plane will be a composite of nine spots as shown in FIG. 7. (The number of frequencies for the respective powers may be two or more).

If high-frequency powers $f_4$ and $f_5$ are applied to the transducer 58a and high-frequency powers $f_1'$ and $f_2'$ to the transducer 58b, there will be provided four spot images, and if a high-frequency power $f_4$ alone is applied, there will be provided a single spot image. Therefore, by scanning the number of spots in accordance with the pattern to be recorded, the recording of the desired pattern may be accomplished through a minimum frequency of scanning. The modulation is effected by ON-OFF of these high-frequency powers, as in the previously described embodiment. Alternatively, a modulator element may be separately provided and the high-frequency powers and the degree of modulation may be controlled in accordance with the number of spots and the wobbling.

In FIG. 6, high-frequency powers $f_1'$, $f_2'$, $f_3'$ and $f_4$, $f_5$, $f_6$ are simultaneously applied to the acousto-optic element, but if high-frequency pulses $f_1'$, $f_2'$, $f_3'$ are repeatedly applied in the sequence of $f_4, f_5, f_6, f_4, f_5, f_6, \ldots$, then the laser light spot will be repeatedly scanned in X-direction to exhibit an effect similar to the wobbling of the electron beam. If this is combined with repeated application of high-frequency powers $f_1'$, $f_2'$, $f_3'$, it will be feasible to effect repeated fine scanning of the nine light spots in FIG. 7. If such fine scanning of the light spots is further combined with the scanning as by galvanometer mirror, recording with economized frequency of the scanning will become possible.

Especially, in the making of a printing stereotype or the like, it will be feasible to form screen dots or change the directions of the screen dots by increasing or decreasing the number of spots which is of the order of maximum 6 × 6.

In the method hitherto described, the directions in which the two sets of high-frequency waves travel are perpendicular to each other, whereas perpendicularity is not always necessary if the two directions are in intersecting relationship with each other, and this may be carried out without two sets of transducers being used, if a set of high-frequency waves reflected angularly with one another is utilized. It is also possible to use two or more acousto-optic elements each having a transducer or to use a plurality of or plural sets of acousto-optic elements to form complicated screen dots which could not be provided by a single set of each element. Electro-optic elements may also be utilized. Further, scanning similar to that of electron beam may be carried out by introducing into the transducers 58a and 58b high-frequency powers whose frequencies are linearly variable with time.

As has been described with respect to the foregoing embodiments, the present invention utilizes the magnification change resulting from the change-over of the light path or the fine deflection effected by the acousto-optic elements to thereby enable a variety of expressions such as figures, picture images or the like to be recorded.

Also, in any of the above-described embodiments, the photosensitive medium has been shown as a photosensitive drum for electrophotography, but it may be any medium, such as silver salts or non-silver salt, which will be insensitive to laser light to effect recording.

Further, the mirror scanner 3 is not limited to the polyhedral rotatable mirror but a galvanometer mirror or other optical Scanning means may also be utilized.

We claim:

1. A method of imaging light on a medium to form a plurality of information elements, said method comprising the steps of:

forming a plurality of light beams;

modulating said plurality of light beams by image information signals in such a manner that the same modulation is applied to each of a predetermined number of said plurality of light beams, said number being selected in accordance with a desired size of the information elements formed on said medium: and deflecting each of said modulated light beams toward said medium to scan said medium and form thereon the predetermined number of rows of light spots having the same modulation;

wherein the size of the information elements, defined by adjacent rows of identical light spots, is changed by varying the number of light beams receiving the same modulation.

2. A method according to claim 1, wherein the modulation step includes:
    detecting a signal corresponding to the size of the information elements to be recorded; and
    controlling the operation of a light modulator in accordance with the detected signal.

3. A method according to claim 1, wherein the step of forming said plurality of light beams includes:
    splitting a light beam generated from a single light beam generator to simultaneously form a plurality of light beams.

4. A method according to claim 1, wherein the step of forming a plurality of light beams includes:
    deflecting a single light beam by a light deflector element to form a plurality of light beams each having a different angle of deflection.

5. A method according to claim 1, wherein the step of forming a plurality of light beams includes:
    forming a plurality of light beams deflected in a first direction and a plurality of light beams deflected in a second direction by an element for deflecting the light beams in response to a plurality of high-frequency signal inputs, whereby said light beams are made into a composite light beam having a greater beam diameter.

6. A method accroding to claim 1, wherein said medium is a light-sensitive medium.

7. An arrangement for imaging light on a medium to form a plurality of information elements, comprising:
    a medium for receiving image information;
    means for forming a plurality of light beams;
    means for modulating said plurality of light beams by image information signals;
    means for deflecting said plurality of modulated light beams toward said medium in order that said light beams will scan said medium and form a plurality of rows of light spots on the surface of said medium; and
    means for controlling said modulating means in such a manner that a predetermined number of said plurality of light beams receive the same modulation to thereby produce the predetermined number of identical rows of light spots on said medium, said predetermined number being selected in accordance with the desired size of the information elements to be recorded;
    wherein the size of the information elements, defined by adjacent rows of identical light spots, is changed by varying the number of light beams receiving the same modulation.

8. An arrangement according to claim 7, wherein said control means includes:
    means for detecting a signal corresponding to the size of the information elements to be recorded; and
    means for controlling the input signal of said light modulator means in accordance with the detected signal.

9. An arrangement according to claim 7, wherein said means for forming a plurality of light beams includes:
    means for splitting a single light beam into a plurality of light beams having different paths of travel.

10. An arrangement according to claim 7, wherein said means for forming a plurality of light beams includes:
    input means for applying a plurality of high-frequency signal inputs having different wavelengths; and
    a light deflector element forming a plurality of light beams having different paths of travel in accordance with the input signals from said input means.

11. An arrangement according to claim 7, wherein said medium is a light-sensitive medium.

12. A device for imaging light on a medium to form a plurality of information elements, comprising:
    a light beam generator;
    a medium for receving image information;
    means for forming a plurality of light beam modulated by information signals;
    deflector means for deflecting said modulated light beams in a first direction;
    means for moving said medium in a second direction different from said first direction;
    optical means for imaging said light beams, after modulation, on said medium; and
    means for controlling said forming means in such a manner that a predetermined number of said plurality of light beams receive the same modulation to thereby produce the predetermined number of identical rows of light spots on said medium wherein the size of the information elements is defined by adjacent rows of identical light spots and wherein said predetermined number is selected in accordance with the desired size of the information elements to be recorded.

13. A device according to claim 12, wherein said means for forming a plurality of light beams includes:
    an ultrasonic wave light modulator to which a plurality of high-frequency signals somewhat different in wavelength is applied as input;
    whereby a plurality of light beams corresponding to the high-frequency signals may be provided from a single light beam.

14. A device according to claim 12, wherein said means for forming a plurality of light beams includes:
    splitter means for splitting the path of said light beam; and
    means for adjusting the inter-beam spacings so that spots of light beams closely adjacent to one another may be provided on said medium for respective ones of said light paths split by said splitter means.

15. A device according to claim 12, wherein said deflector means includes means for finely scanning the modulated light beams.

16. A device according to claim 12, wherein said medium is a light-sensitive medium.

17. A device according to claim 12, wherein an array of information elements of a predetermined size forms at least one character.

18. A device for imaging light on a medium to form a plurality of information elements, comprising:
    a light beam generator;
    a medium for receiving image information;
    first means for deflecting said light beam in a predetermined direction with respect to said medium to form a plurality of light beams;
    means for modulating said plurality of light beams by information signals;
    second means for deflecting said plurality of modulated beams to scan said medium in a direction substantially perpendicular to said predetermined direction;
    means for providing signal corresponding to the desired size of the information elements; and
    means for imparting to said modulating means a signal for selectively varying the mode of modulation of said modulating means in such a manner that a predetermined number of said plurality of light beams, selected in accordance with the desired size of the information elements formed on said medium, are modulated by the same information signals in order to form rows of correlated light spots on said medium which define the information elements.

19. A device according to claim 18, wherein said means for imparting a signal for selectively varying the mode of modulation includes:
means for varying the number of light beams deflected in said predetermined direction and subjected to the same modulation, in accordance with the size of the information elements to be recorded.

20. A recording according to claim 18, wherein said means for imparting a signal for selectively varying the mode of modulation includes:
means for varying the modulation time for each of said plurality of beams, in accordance with the size of the information elements to be recorded.

21. A device according to claim 18, wherein said medium is a light-sensitive medium.

22. A device according to claim 18, wherein said first deflecting means and said modulating means is a modulator-deflector element.

23. In a method of imaging light on a medium to form information elements comprising the steps of modulating a light beam with an image information signal, deflecting the modulated light beam in a first direction by deflection means having mirror faces rotatable or pivotable at a predetermined velocity, moving a medium in a second direction intersecting said first direction and imaging the modulated light beam on said medium, the improvement comprising the steps of:
modulating a plurality of light beams by image information signals in such a manner that the same modulation is applied to each of a predetermined number of said plurality of light beams, said number being selected in accordance with a desired size of the information elements, and deflecting each of the modulated light beams toward said medium to scan said medium and form thereon the predetermined number of rows of light spots having the same modulation and wherein the size of the information elements is changed by varying the number of light beams receiving the same modulation.

24. A method according to claim 23, the improvement residing in the step of:
providing from a single light beam the plurality of light beams by a light deflector element to which is applied a plurality of high-frequency signals somewhat different in wavelength, said plurality of light beams corresponding to said high-frequency signals.

* * * * *

UNITED STATES PATENT OFFICE

CERTIFICATE OF CORRECTION

Patent No. 4,060,323　　　　　　　Dated November 29, 1977

Inventor(s) KAZUHIRO HIRAYAMA, ET AL

It is certified that error appears in the above-identified patent and that said Letters Patent are hereby corrected as shown below:

On the title page, item [30] entitled "Foreign Application Priority Data" before "Sept 9, 1974 Japan ........49-103642" insert:

--July 10, 1974　　Japan...........49-79475
　　　　Aug 22, 1974　　Japan...........49-96500-- and after "Sept 9, 1974 Japan ...........49-103642" insert

--Sept 12, 1974　　Japan...........49-105257
　　　　Sept 14, 1974　　Japan...........49-106342
　　　　Oct  14, 1974　　Japan...........49-117892
　　　　Dec  17, 1974　　Japan...........50-144727--

Column 1, line 23, "of" should read --or--;

Column 2, line 28, "presen" should read --present--;

Column 6, line 14, "repsect" should read --respect--;

Column 6, line 26, "sown" should read --shown--;

Column 7, line 3, insert --are-- before "in";

Column 7, lines 37 and 38, "deliver" should read --delivers--;

Column 7, line 49, "corresponds" should read --correspond--;

Column 8, line 38, " $S_1"‚_1$ " should read --$S_1'$, $S_1$--;

UNITED STATES PATENT OFFICE
CERTIFICATE OF CORRECTION

Patent No. 4,060,323     Dated November 29, 1977

Inventor(s) KAZUHIRO HIRAYAMA, ET AL

It is certified that error appears in the above-identified patent and that said Letters Patent are hereby corrected as shown below:

Column 9, line 39, insert --made-- before "into";

Column 9, line 57, "11" should read --12--;

Column 9, line 68, "charge" should read --charged--;

Column 11, line 18, "angels" should read --angles--;

Column 12, line 46, "3" should read --5--;

Column 12, line 48, "Scanning" should read --scanning--;

Column 13, Claim 6, line 26, "accroding" should read --according--;

Column 14, Claim 12, line 9, "receving" should read --receiving--.

Signed and Sealed this

Twenty-fourth Day of October 1978

[SEAL]

Attest:

RUTH C. MASON
*Attesting Officer*

DONALD W. BANNER
*Commissioner of Patents and Trademarks*